(12) United States Patent
Spear

(10) Patent No.: US 12,228,097 B2
(45) Date of Patent: Feb. 18, 2025

(54) SYSTEM AND METHOD OF GRAIN IGNITION AND INHIBITOR RELEASE USING PHASE ALLOY FILMS

(71) Applicant: SPARC Research LLC, Warrenton, VA (US)

(72) Inventor: Guy B. Spear, Warrenton, VA (US)

(73) Assignee: SPARC RESEARCH LLC, Warrenton, VA (US)

( * ) Notice: Subject to any disclaimer, the term of this patent is extended or adjusted under 35 U.S.C. 154(b) by 0 days.

(21) Appl. No.: 18/380,892

(22) Filed: Oct. 17, 2023

(65) Prior Publication Data
US 2024/0125290 A1 Apr. 18, 2024

Related U.S. Application Data

(60) Provisional application No. 63/416,731, filed on Oct. 17, 2022.

(51) Int. Cl.
*F02K 9/95* (2006.01)
*F02K 9/28* (2006.01)
*F02K 9/34* (2006.01)

(52) U.S. Cl.
CPC ............ *F02K 9/95* (2013.01); *F02K 9/28* (2013.01); *F02K 9/346* (2013.01); *F05D 2260/99* (2013.01)

(58) Field of Classification Search
CPC .............. F02K 9/28; F02K 9/346; F02K 9/95
See application file for complete search history.

(56) References Cited

U.S. PATENT DOCUMENTS

| | | | | |
|---|---|---|---|---|
| 3,258,910 A * | 7/1966 | Seymour | ........... | F42B 3/113 |
| | | | | 60/39.821 |
| 3,509,822 A * | 5/1970 | Burton | ........... | F02K 9/10 |
| | | | | 102/289 |
| 7,012,233 B2 * | 3/2006 | Brown | ........... | F02K 9/80 |
| | | | | 89/1.813 |
| 9,329,011 B1 * | 5/2016 | Smith | ........... | F42C 19/0819 |
| 2018/0142646 A1 * | 5/2018 | Minick | ........... | F02K 9/97 |

OTHER PUBLICATIONS

Ceramoptec, Aluminum coated fiber optics for harsh environments, Jun. 28, 2022, (Year: 2022).*
Hardt, A.P., "Incendiary Potential of Exothermic Intermetallic Reactions", Technical Report AFATL-TR-71-87, Jul. 1971.
Indium Corporation, "Product Data Sheet NanoFoil(R)", 2021.

* cited by examiner

*Primary Examiner* — Kyle Robert Thomas
(74) *Attorney, Agent, or Firm* — MEAGHER EMANUEL LAKS GOLDBERG & LIAO, LLP

(57) ABSTRACT

Solid rocket motors or ramjets may be provided. Such devices may include a combustion chamber containing at least one fuel, a metal phase alloy film within the combustion chamber, where the metal phase alloy film coupled to the at least one fuel, and an activator operably coupled to the metal phase alloy film, the activator including an electrical activation system, a laser activation system, or an initiator activation system. This allows combined functional features on pulse motors to release inhibitors and ignite solid fuel/propellant. Fast reactions can be achieved by controlling the thickness of the alloys and using multiple layers to achieve the areal energy density. Foils can be rolled and inserted into the fuel/propellant bore. When rolled, it can easily follow the grain bore diameter changes with temperature and provide no additional mechanical loads to the grain.

17 Claims, 8 Drawing Sheets

SYSTEM AND METHOD OF GRAIN IGNITION AND INHIBITOR RELEASE USING PHASE ALLOY FILMS

CROSS-REFERENCE TO RELATED APPLICATION

The present application claims priority to U.S. 63/416,731, filed Oct. 17, 2022, the contents of which are incorporated by reference herein in its entirety.

TECHNICAL FIELD

The present disclosure is drawn to solid rocket motors and ramjets, and specifically phase alloy films for grain ignition and inhibitor release systems for solid rocket motors and ramjets.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Solid rocket motors use small rocket motors as an igniter system. Similarly, pulse motor barriers for end or bore inhibitors have historically used fast deflagrating cord or detonation cord to remove the barrier and ignite the propellant. Such systems are expensive, complex, and have numerous failure modes.

BRIEF SUMMARY OF THE INVENTION

To avoid the problems with conventional igniter systems and inhibitor systems, techniques utilizing a phase alloy film may be provided.

In some embodiments, a phase alloy film can replace the complex igniter systems, providing the ignition heat source and ensuring the ignition pressure is above the level required to sustain ignition. In some embodiments, a phase alloy film is configured to ignite substantially all of the grain adjacent to it, and accurately separates the inhibitor from the grain in areas that are desired to burn.

In various aspects, a solid rocket motor or ramjet may be provided. The solid rocket motor or ramjet may include a combustion chamber. The combustion chamber may include at least one fuel. The fuel may include at least one multi-pulse fuel grain. The solid rocket motor or ramjet may include a metal phase alloy film. The metal phase alloy film may be disposed within the combustion chamber. The metal phase alloy film may be coupled to the at least one fuel.

In some embodiments, at least a portion of an outer surface of the metal phase alloy film may be coupled to an inner surface of the at least one fuel. In some embodiments, a portion of the metal phase alloy film may include a bent portion. The bent portion may be bent 90 degrees within the combustion chamber to allow a laser to interact with the bent portion.

The solid rocket motor or ramjet may include an activator. The activator may be operably coupled to the metal phase alloy film. The activator may include an electrical activation system, a laser activation system, or an initiator activation system. The electrical activation system may include an electrical power source coupled to one or more metal contacts mechanically attached to the metal phase alloy film. The laser activation system may include a laser source coupled to one or more optical fibers. The one or more optical fibers may be configured to direct a laser towards the metal phase alloy film such that the laser interacts with the metal phase alloy film in a substantially normal direction. The one or more optical fibers may be aluminum-coated optical fibers. The one or more optical fibers are configured to bend (e.g., bend 90 degrees) within the combustion chamber. The initiator activation system may include an initiator configured to convert an electrical charge to a hot exhaust output. The hot exhaust output may be configured to heat the metal phase alloy film to above a threshold temperature, within a predetermined time period, to ignite the metal phase alloy film. The initiator activation system may be free of an intermediate booster charge.

The solid rocket motor or ramjet may include a forward retainer coupled to an end portion of the metal phase alloy film. The solid rocket motor or ramjet may include an erodible inhibitor within the combustion chamber. In some embodiments, at least a portion of an outer surface of the erodible inhibitor may be coupled to an inner surface of the metal phase alloy film. Preferably, the inhibitor is not ejected unless it is broken into small fragments so that it will not block the nozzle or cause pressure pulses. The inhibitor is preferably retained and allowed to erode away. The areas released by the phase alloy foil are preferably those designed to ignite and burn.

In various aspects, a method for propulsion may be provided. The method may include combusting a metal phase alloy film upon electrical activation, laser ignition, or initiator activation. At least a portion of the metal phase alloy film may be coupled to at least one fuel. The method may include allowing the metal phase alloy film to ignite the at least one fuel over an area required to sustain burning.

The method may include releasing an inhibitor coupled to the at least one fuel.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or" as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Figure 1:
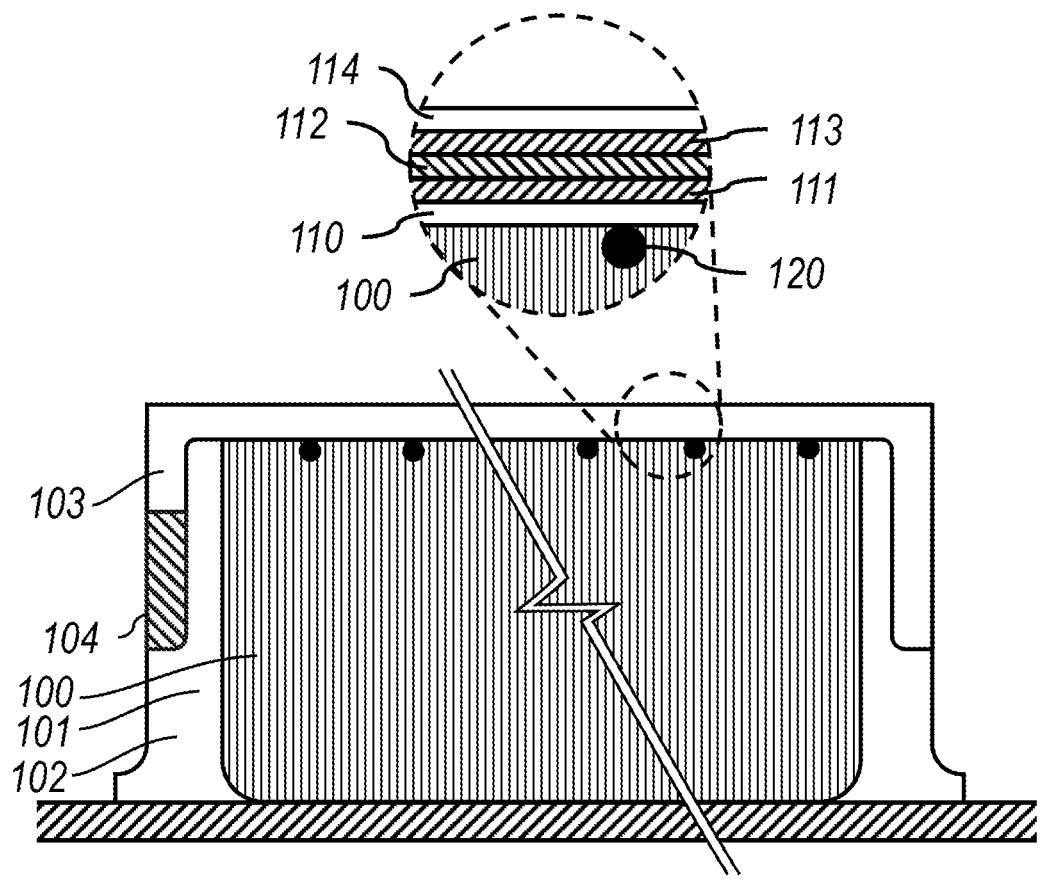
FIG. 1 is a schematic of a conventional inhibitor release system using Hivelite cord in cut grooves of propellant.

Conventional inhibitor release systems, such as the system shown in FIG. 1, utilize complex and costly ignition systems. In FIG. 1, propellant 100 is contained within a sealed housing 101. The housing includes, e.g., side portions 102 and top portion 103, which may be sealed together via sealant 104. The top portion 103 may utilize multiple layers, such as an inner aluminum foil layer 110 coupled to the propellant 100, a glass cloth barrier layer 112 coupled to the inner foil layer via a silicone adhesive layer 111, and an inhibitor layer 114 coupled to the glass cloth barrier via a silicone adhesive layer 113. Hivelite cord 120 may be disposed within the propellant, near, or in contact with, the inner foil layer.

Figure 2:
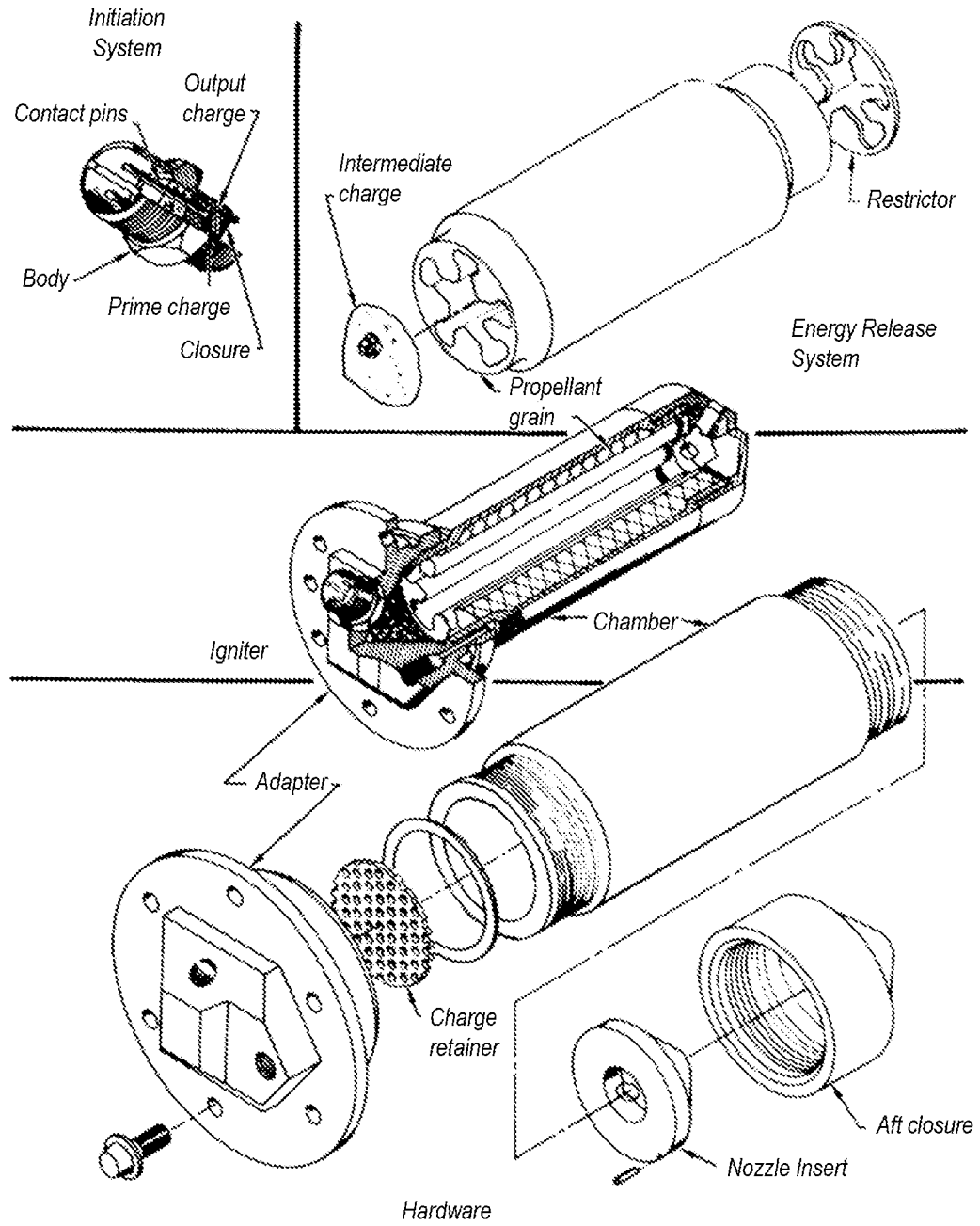
FIG. 2 is a schematic of a conventional solid rocket pyrogen ignition system.

One such ignition system is seen in FIG. 2, extracted from NASA SP-8051, Solid Rocket Motor Igniter. FIG. 2 is an example of a typical solid rocket motor (SRM) igniter. It is expensive, complex, and heavy. The weight may constitute up to 5% of the total SRM weight depending on application. The igniter is essentially a stand-alone gas generator which increases expense and complexity. Upon command for ignition, the system ignition line sends an electrical charge to a thru-bulkhead initiator (TBI) (see FIG. 2, top left). The initiator ignites a small charge of $BKNO_3$ which then ignites a large charge of $BKNO_3$ under the charge retainer that ignites the pyrogen grain. The pyrogen exhaust heats the SRM grain to ignition. It is very much a bootstrap effort.

To avoid these costs and complexities, in some embodiments, a gasless, phase alloy film can replace substantially all of a conventional igniter system to provide the ignition heat source and easily be designed and positioned over sufficient grain area to ensure the ignition pressure is above the level required to sustain ignition.

Ignition with a low-cost film eliminates all the possible failure mechanisms for an igniter, reduces components and cost, and simplifies the ignition train to just an electrical signal or laser pulse; no initiator is required.

Phase alloys have been used in wires for burning augmentation and for initiation at set temperatures for insensitive munition cookoff sensors.

In some embodiments, a solid rocket motor 300 (see FIG. 3A) or ramjet 301 (see FIG. 3B) may be provided. The direction 305 of airflow can be seen.

The solid rocket motor or ramjet may include a combustion chamber 310. The combustion chamber may be substantially cylindrical, having a central axis 311.

The combustion chamber may be defined by an inner surface 312 of an outer housing 313 (or "casing") defining an internal volume of space. The outer housing may include a metal, a metal alloy, or a combination thereof. Non-limiting examples of such materials include an aluminum alloy, titanium, molybdenum, or a molybdenum alloy.

The combustion chamber may include at least one fuel 320. The fuel may include, e.g., at least one multi-pulse fuel grain 321. Such fuels, including multi-pulse fuel grains, are well-known in the art. As used herein, the term "grain" refers to the propellant charge as a whole, and does not refer to the weight, particle size, or texture of the propellant charge.

As is understood in the art, the grain may include a polymeric material, such as POM (Polyoxymethylene)/Polyacytal polymers, and/or pentaerythrital (PETA). The grain may include a metal powder, such as aluminum, magnesium, or an alloy. The grain may include a burn rate accelerant such as iron nanopowder or aluminum nanopowder along with two or more energetic materials. The grain may include two or more energetic materials, which may have the same or different linear burn rates. As noted above, such energetic materials are known in the art, such as those disclosed in Akhaven, J., *The Chemistry of Explosives* (2011), and Agrawal, J. P., *High Energy Materials Propellants, Explosives and Pyrotechnics* (2015), the disclosures of which are incorporated by reference herein in their entirety. Non-limiting examples of materials utilized in a grain may include 2,4,6-trinitrotoluene (TNT), cyclo-1,3,5-trimethylene-2,4,6-trinitramine (RDX), cyclotetramethylenetetranitramine (HMX), pentaerythrol tetranitrate (PETN), 3-nitro-1,2,4-triazol-5-one (NTO), nitroglycerine (NG), nitrocellulose (13% N) (NC), ammonium nitrate (AN), ammonium perchlorate (AP), 2,4,6,8,10,12-(hexanitrohexaaza)tetracyclododecane (CL20 or HNIW), 1,3,3-trinitroazetidine (TNAZ), octanitrocubane (ONC), 1,1-cliamino-2,2-dinitroethene (FOX-7), ammonium dinitramide (ADN), and mixtures thereof.

The fuel may be configured to have an inner surface 322 and an outer surface 323.

The solid rocket motor or ramjet may include a phase alloy film 330 (sometimes referred to as a phase alloy foil). The film may include (and may consist of) two or more layers of metals that vigorously react when they alloy to release heat. Since the alloying process is governed by molecular diffusion of atoms, the film may consist of multiple thin layers to minimize diffusion distance and reduce the film reaction time. The phase alloy film may be disposed within the combustion chamber 310. The phase alloy film may be coupled to the at least one fuel.

The film may have an inner surface 331 and an outer surface 332. The outer surface 332 being in contact with at least a portion of the inner surface 322 of the fuel.

The phase alloy foil must be exothermic. The phase alloy foil is preferably a metal phase alloy. Many metal phase alloys are highly exothermic. They can be designed for fast reactions by controlling the thickness of the alloys and using multiple layers to achieve a desired areal energy density.

The thickness required may vary (e.g., based on vendor or specific composition, etc.). In some embodiments, the thickness may be at least 40 μm. In some embodiments, the thickness may be at least 60 μm. In some embodiments, the thickness may be at least 80 μm. In some embodiments, the thickness may be at least 100 μm. In some embodiments, the thickness may be no more than 1 mm. In some embodiments, the thickness may be no more than 800 μm. In some embodiments, the thickness may be no more than 600 μm. In some embodiments, the thickness may be no more than 400 μm. In some embodiments, the thickness may be no more than 200 μm.

They can be rolled and easily inserted into the fuel/propellant bore. Any exothermic metal phase alloy material may be utilized.

Non-limiting examples of such alloy materials include Ti-2B, Ni—Al, and/or Pd—Al. One commercial product is Induim's NANOFOIL® multi-layer phase alloy foil, which uses the Ni—Al system (see Product Data Sheet found at www.indium.com/technical-documents/product-data-sheets/download/4811/, last accessed Jul. 5, 2022, the entirety of which is incorporated by reference herein). It has a high density of 5.6-6.0 gm/cm 3 and a heat of reaction between 1,050 and 1,250 J/gm. Foil temperatures reach 1623K to 1773K and the average burning rate is 7.25 m/sec. The reaction is referred to as gasless and produces liquid molten Ni—Al particles.

Additional metal phase alloys can be found in Alexander P. Hardt, "*Incendiary Potential of Exothermic Intermetallic Reactions*" AFATL-TR-71-87 (1971), the entirety of which is incorporated by reference herein.

In some embodiments, the foil is rolled such that it follows the grain bore diameter changes with temperature and provides no additional mechanical loads to the grain.

Each of the metal phase alloys require sizing multiple layer thicknesses in a single integral foil to provide the reaction speed desired. Power or heat initiation levels will depend on the metals being used and the thickness.

The solid rocket motor or ramjet may include a forward retainer 340 (which may be, e.g., plastic), which may be coupled or fastened to a forward closure 350. The phase alloy foil may be attached to the plastic forward retainer. The forward retainer may include a non-conductive phenolic-type material. As seen, the forward retainer may enclose an end of the housing 313, for rocket motors, or may have an opening 341 through which air can enter the combustion chamber, for ramjets.

The solid rocket motor or ramjet may include an activator system 360 to ignite the foil. The activation may result from electrical activation, laser ignition, or initiator activation.

Figure 4:
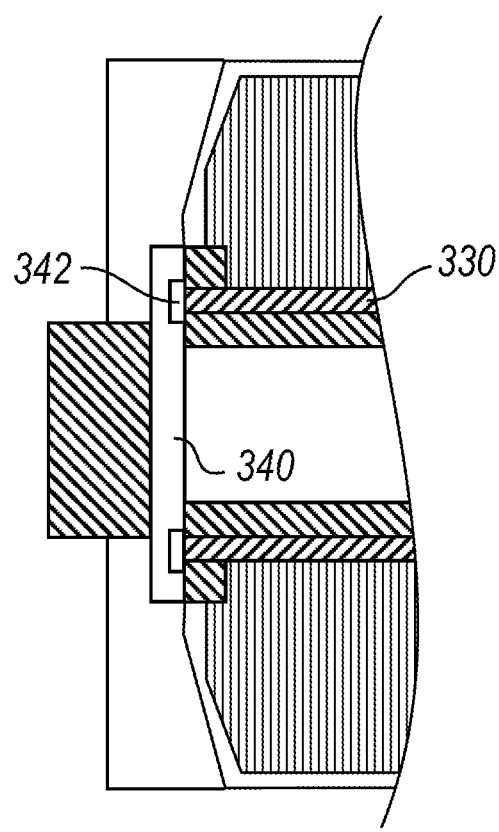
FIG. 4 is a cut-away illustration of a simplified design of a portion of a solid rocket motor using a metal phase alloy film with an electrical activator.

Referring to FIG. 4, if the foil is initiated electrically, the electrical charge from an electrical power source may go directly to metal contacts 342 (which may be, e.g., copper) on the forward retainer which are mechanically attached to the phase alloy film 330. For point contact, an electrical charge of 10 A and 5V may be sufficient for a Nickel/Aluminum NANOFOIL® multi-layer phase alloy foil from Indium Corp. Other metal phase alloys and/or and foil thicknesses may require a different amperage and/or voltage.

If the foil is initiated via laser ignition, an 8-nanosecond pulse with power of 10 to 300 mJ for diameters of 10 to 100 microns may be sufficient to ignite the Nickel/Aluminum NANOFOIL® multi-layer phase alloy foil. See Table 1, below.

TABLE 1

| Laser Type | Pulse Duration (ns) | Spot Diameter (μm) | Pulse Power (mJ) |
|---|---|---|---|
| YAG laser: 1064 nm wavelength, pulsed | 8 | 100 | >300 |
| YAG laser: 1064 nm wavelength, pulsed | 8 | 50 | >50 |
| YAG laser: 1064 nm wavelength, pulsed | 8 | 10 | >10 |

Other metal phase alloys and/or and foil thicknesses may require a different pulse duration, diameter, and/or power level.

Figure 5A:
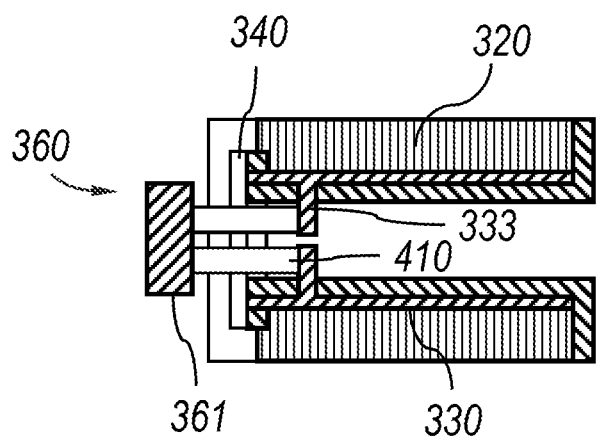
FIGS. 5A and 5B are cut-away illustrations of a simplified design of a portion of a solid rocket motor using a metal phase alloy film with a laser-based activator.
Figure 5B:
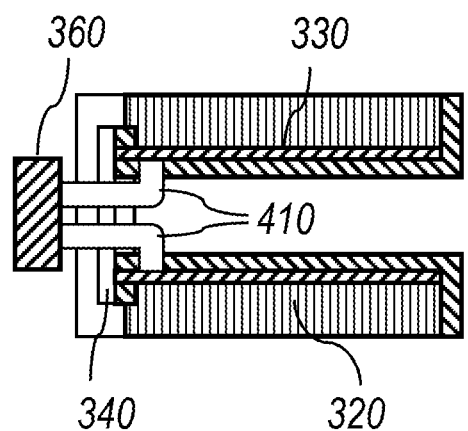

In some embodiments, the laser ignition system (e.g., an activation system) may utilize fiber optics to transfer the laser power, and allow the laser to interact with the metal phase alloy film. As seen in FIGS. 5A and 5B, activator system 360 (here, a typical laser initiator) may utilize a laser system 361 to provide one or more lasers through one or more optical fibers 410. In some embodiments, a single fiber may be sufficient. In some embodiments, a plurality of fibers may be utilized. The fibers may be coated fibers, such as aluminum-coated fibers. The optical fibers may be configured to direct the laser(s) in a direction that is substantially normal to the foil.

As seen in FIG. 5A, in some embodiments, the fiber may be substantially straight. As used herein, the term "substantially straight" refers to a component that has a central long axis varying less than 10° from beginning to end. The foil may have a portion 333 that extends radially inward within the combustion chamber. The foil may be configured such the laser passing through the fiber may be normal or near-normal to the portion 333 of the foil at a target ignition location. As used herein, the term "near-normal" refers to angles up to approximately 10' away from normal (that is angles ranging from approximately −10° to approximately +10"). This could be done by, e.g., having a fiber that only bends 5°, and the portion of the foil bending inward by 85°, to allow the laser to be normal to the foil.

In some embodiments, a portion of the metal phase alloy film may include a "bent portion" (e.g., portion 333). In some embodiments, the bent portion may be bent at an angle B1 (relative to the central axis) where 80°≤B1≤100°, within the combustion chamber to allow the laser to interact with the bent portion. In some embodiments, B1 is 90 degrees. In some embodiments, the bent portion may be bent at an angle B2 (relative to the inner surface of the fuel 320) where 80°≤B2≤100°, within the combustion chamber to allow the laser to interact with the bent portion. In some embodiments, B2 is 90 degrees.

Figure 5C:
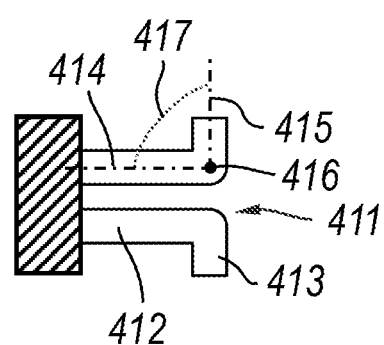
FIG. 5C is an illustration of just a laser-based activator and optical fibers.

As seen in FIG. 5B, in some embodiments, the fiber may bend or otherwise be configured to direct the laser to the foil. Referring to FIGS. 5B and 5C, a fiber 410 may have a bend 411 at an intermediate point such the bend 411 is formed between two portions 412, 413 of the fiber. An angle 417 may be formed at the point 416 where a centerline 414 of the first portion 412 and a centerline 415 of the second portion 413 meet. In some embodiments, the angle A may be 10°<A<180°. In some embodiments, the angle A may be 45°≤A≤135°. In some embodiments, the angle A may be 90°≤A<180°. In some embodiments, A may be 90°.

Aside from electrical and laser ignition, hot exhaust output from standard initiators or other heat sources may be utilized to ignite the foil. For example, Nickel/Aluminum NANOFOIL® multi-layer phase alloy foil may ignite when heated to 200° C. at a heating rate of 200° C./min. Thus, hot exhaust output can be configured to ignite the metal phase alloy film by heating the film to above a threshold temperature within a predetermined time period. In some embodiments, the threshold temperature is at least 150° C. In some embodiments, the threshold temperature is at least 175° C. In some embodiments, the threshold temperature is at least 200° C. In some embodiments, the threshold temperature is less than 1000° C. In some embodiments, the threshold temperature is less than 750° C. In some embodiments, the threshold temperature is less than 500° C. In some embodiments, the predetermined time period is no more than 2 minutes. In some embodiments, the predetermined time period is no more than 1.5 minutes. In some embodiments, the predetermined time period is no more than 1 minute.

In some embodiments, the initiator may be configured to convert an electrical charge to the requisite hot exhaust output using a standard initiator.

Referring again to FIG. 3A, the solid rocket motor or ramjet may include an erodible inhibitor 370. The inhibitor may have an inner surface 371 and an outer surface 372. The inhibitor may be configured such than an outer surface 372 of the inhibitor is in contact with an inner surface 331 of the phase alloy foil. In some embodiments, the inhibitor is configured such that only a portion of fuel source is ignited at activation. In some embodiments, the erodible inhibitor is mechanically restrained in place within the combustion chamber.

Figure 3A:
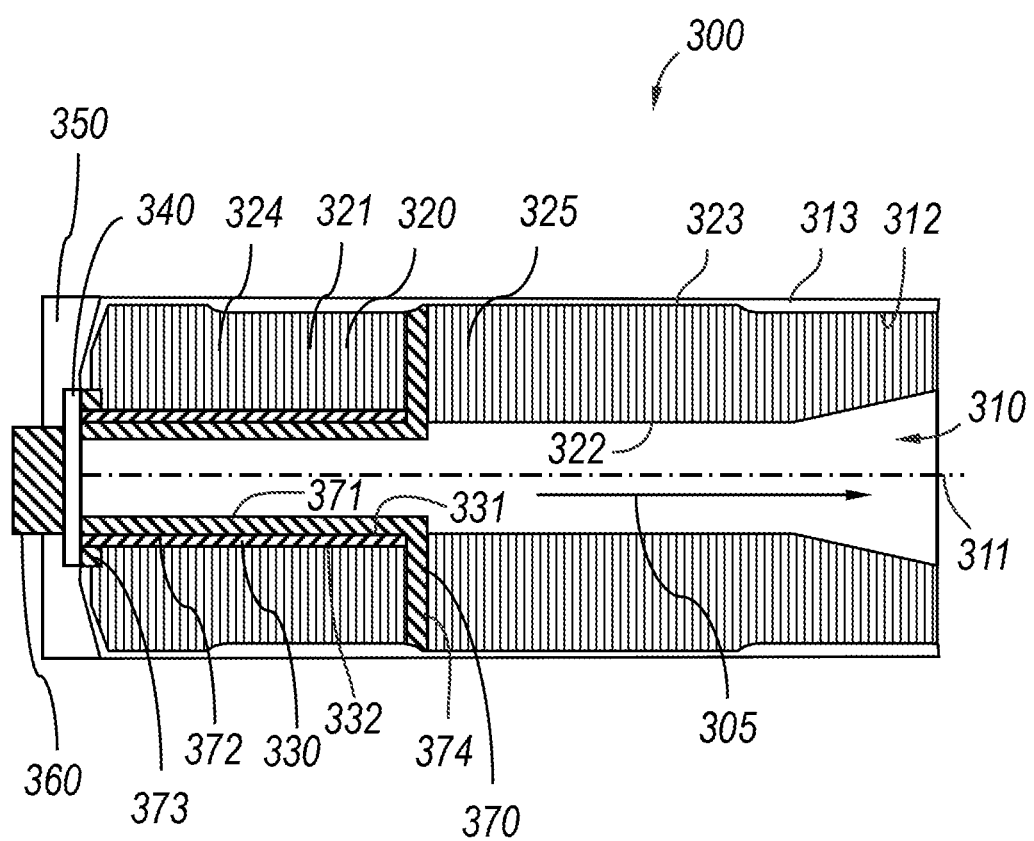
FIG. 3A is a cut-away illustration of a simplified design for a solid rocket motor using a metal phase alloy film in a pulse grain.
Figure 3B:
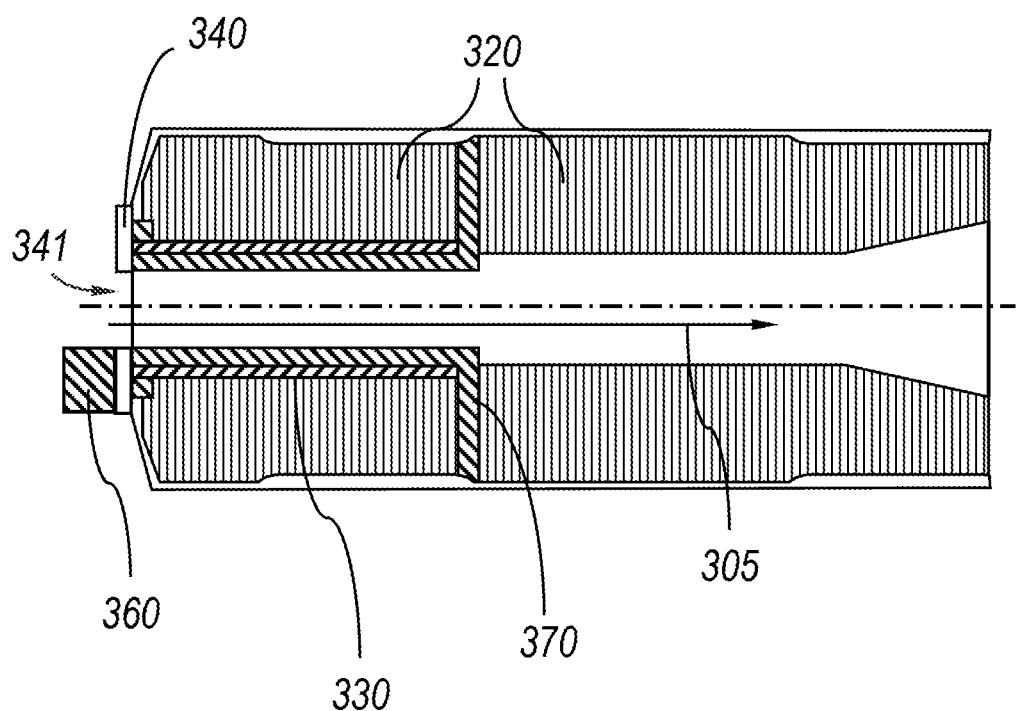
FIG. 3B is a cut-away illustration of a simplified design for a ramjet using a metal phase alloy film for the pulse grain.

As shown in FIG. 3A, the inhibitor may have one or more portions 374 extending radially outward, configured such that a first portion 324 of the fuel source that is located radially outward from a portion of the phase alloy foil may be separated from a second portion 325 of the fuel source that is not located radially outward from any portion of the phase alloy film 330 by the portion 374 of the inhibitor extending radially outward.

In some embodiments, an inner surface of the inhibitor may be in contact with the forward retainer 340. In some embodiments, a portion 373 of the inhibitor may be disposed radially outward from the phase alloy foil. In some embodiments, the portion may be at least partially between the forward retainer and the propellant.

In some embodiments, the solid rocket motor or ramjet may include one or more cords (e.g., conventional cords, such as the Hivelite cord previously discussed). In some embodiments, the solid rocket motor or ramjet may be free of such cords.

In some embodiments, the solid rocket motor or ramjet may be free of pyrotechnic or pyrogen igniters, which can be expensive and complex.

To operate the disclosed phase alloy igniters requires three basic steps:

1. Combusting the (metal) phase alloy film in a short time (preferably as short as possible) upon electrical activation, laser ignition, or initiator activation.

2. Igniting the fuel and/or propellant over an area required to sustain burning.

3. Releasing any inhibitor from the fuel/propellant if used in a pulse motor application.

The objective of an ignition system is generally to reach a design operating condition in a minimum time after the firing signal is given. A typical ignition event must occur over a short time (t<<1 sec) to allow the propulsion system to reach the stable operating condition as quickly as possible. As will be understood, the combustion step described above must necessarily occur within that shortened time frame.

Typical ignition trains generally start with a firing signal (e.g., electrical, laser, etc.) to an initiator, which starts the scale-up process leading to combustion of the propulsion unit's propellant (main grain). As described previously, the initiator may ignite an intermediate charge such as $BKNO_3$ ignition pellets, which in turn ignites a pyrogen igniter grain (see FIG. 2). The pyrogen igniter grain may then discharge into the propellant chamber to ignite the main grain which pressurizes the motor to the operating pressure. The complete sequence of events from firing signal to grain ignition varies widely with motor size but may take several hundreds of milli-seconds. The disclosed devices may be free of an intermediate booster charge.

Figure 6:
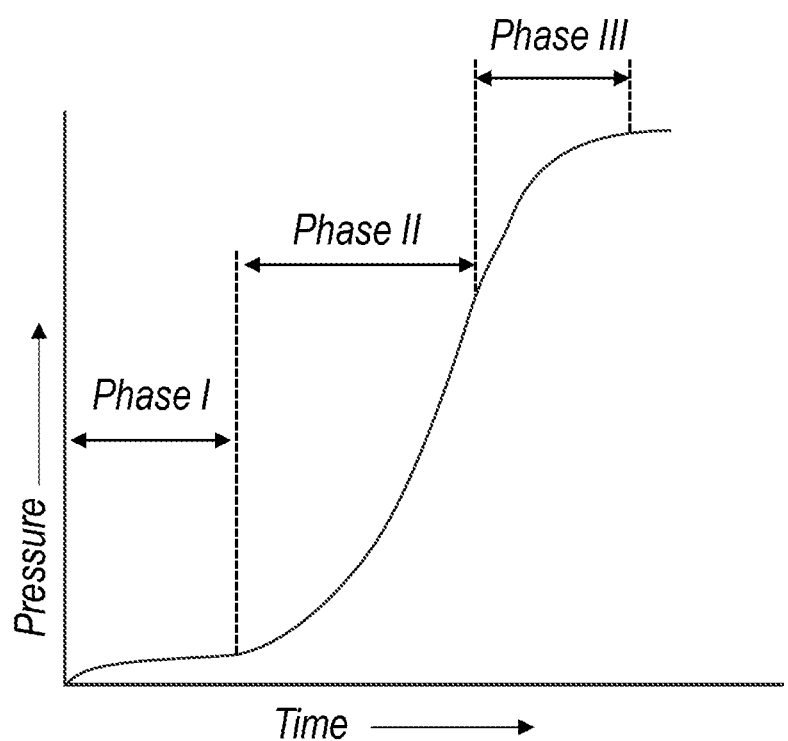
FIG. 6 is a notional depiction of chamber pressure during an ignition.

A complete timeline of events of a general ignition sequence can be understood in view of FIG. 6. In FIG. 6, Phase I occurs from firing signal to ignition of the main grain. Phase II is flame spread over the complete main grain surface for start of full combustion, and Phase III is the pressurization period that reaches the propulsion unit's designed operating condition.

The ignition of a pulse grain is further complicated since the grain is fully contained within an insulation system. The grain is typically ignited to release the barrier as quickly as practicable, thus further lengthening the above sequence.

The disclosed system allows the firing signal to directly ignite the phase alloy film, which is sized to quickly ignite the propellant. This eliminates all the intermediate scaleup energy devices and time steps to reach operating condition. That is, by incorporating the film, the Phase II and Phase III pressurization time required to reach the design operating pressure can be minimized. The film may cover as much of the propellant surface as needed or desired, and typically the more surface is covered by the film, the more the Phase II and Phase times can be reduced.

While the invention is described through the above-described exemplary embodiments, modifications to, and variations of, the illustrated embodiments may be made without departing from the inventive concepts disclosed herein. For example, although specific parameter values, such as dimensions and materials, may be recited in relation to disclosed embodiments, within the scope of the invention, the values of all parameters may vary over wide ranges to suit different applications.

The disclosed phase alloy igniter replaces a conventional system (such as that in FIG. 2), and preferably consists of only a thin rolled sheet of highly exothermic phase alloy metal, electrical connections, and a mounting fixture rather than the large part list seen in FIG. 2.

A model for grain ignition was developed for comparison to a pyrogen igniter. The reacted Ni—Al was assumed to form a uniform liquid film which defines the initial start of grain heating. An ignition criterion based on laser ignition tests was used. The liquid film conducts heat to the grain until the ignition criterion is met. No supplemental heating from the propellant combustion gas or other sources was applied.

Figure 7:
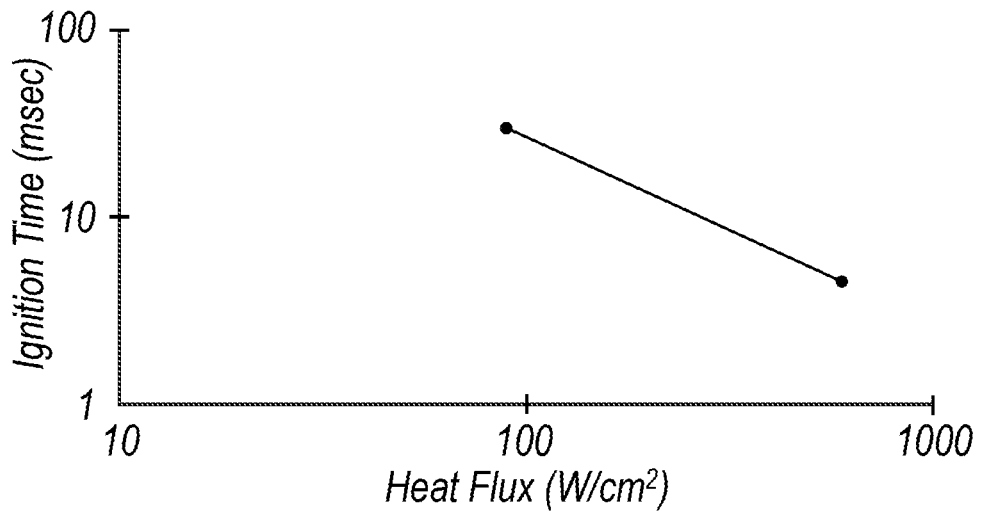
FIG. 7 is a graph showing ignition times for an example laser ignition of a composite aluminized propellant.

Ignition data, seen in FIG. 7, was obtained from propellant DK-02 described in A. Olivani, et. al., "*Aluminum Particle Size Influence on Ignition and Combustion of AP/HTPB/Al Solid Rocket Propellants*," NATO RTO-MP-091, 2002, which was an aluminized composite propellant with equal amounts of course and fine AP. This represents a typical ignition response characteristic for composite propellants. Heat fluxes in SRM vary widely, but the peak flux is typically on the order of 200-500 W/cm².

Figure 8:
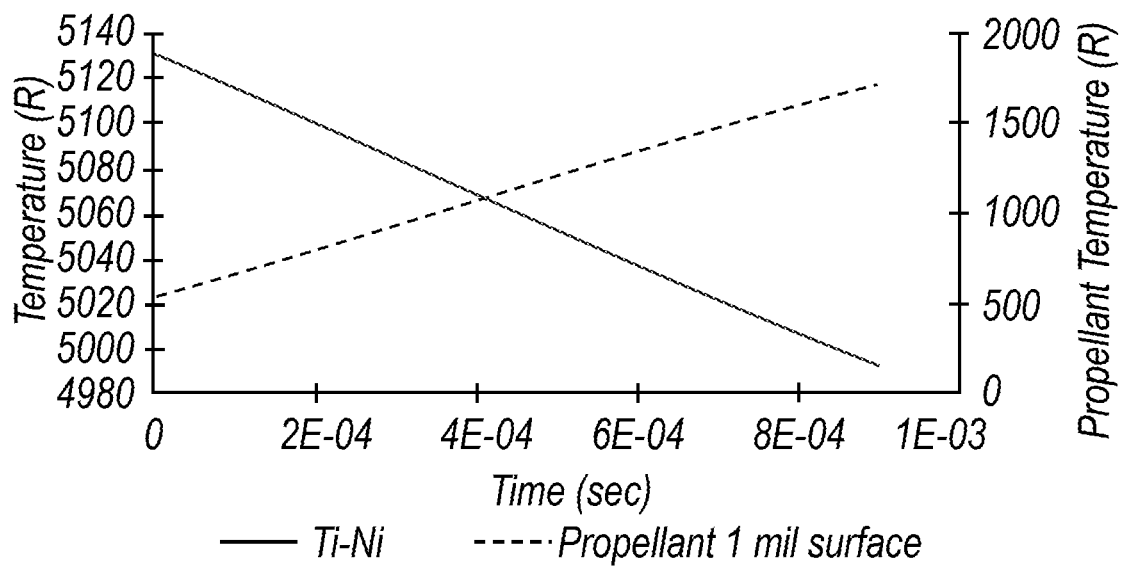
FIG. 8 is a graph showing modeled values for an example 100 μm Ni-AL foil ignition of a composite aluminized propellant.

In comparison, the model predictions with 100 µm of Indium's Ti—Ni NANOFOIL® multi-layer phase alloy foil are shown in FIG. 8. The heat flux is sufficient to ignite the propellant in one millisecond which is over an order of magnitude faster than with gas from a pyrogen igniter.

In addition, a pyrogen igniter will ignite the impingement points first, and the combined grain products and pyrogen gas then ignite the remainder of the grain. In contrast the phase alloy material has a small delay due to the burn time of, e.g., 7.25 m/s, then ignites the propellant under it on the order of 1 msec as disclosed herein.

The savings in mass requirements is substantial—using the thickest Ni—Al foil of 100 µm (approximately the thickness of an aluminum soda can), a foil covering 60% of a 6-inch ID, 100-in long bore is under 1 lb. There will be small weight associated with the mounting fixture and electrical connector, but the total is far lighter than the several pounds for a pyrogen igniter.

As noted above, the ignition signal for a pyrogen igniter is transformed to a heat input via the TBI. The phase alloy does not require a TBI for initiation. It can be ignited by heat but can also be directly initiated electrically which provides a far simpler and easier interface to the new electronic safe and arm firing (ESAF) devices that are now being used.

It is clear that the phase alloy igniter provides easier integration with new electronic safe and fire (ESAF) ignition systems. It is far lighter, has fewer components to decrease both expense and complexity compared to a pyrogen igniter. It also has faster and more uniform heating of grain areas under the foil.

Various modifications may be made to the systems, methods, apparatus, mechanisms, techniques, and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A solid rocket motor or ramjet, comprising:
   a combustion chamber containing at least one fuel;
   a grain ignition component consisting of a metal phase alloy film within the combustion chamber, the metal phase alloy film configured to ignite the at least one fuel; and
   an activator operably coupled to the metal phase alloy film, the activator including an electrical activation system, a laser activation system, or an initiator activation system.

2. The solid rocket motor or ramjet according to claim 1, further comprising a forward retainer coupled to an end portion of the metal phase alloy film.

3. The solid rocket motor or ramjet according to claim 2, wherein the electrical activation system comprises an electrical power source coupled to one or more metal contacts mechanically attached to the metal phase alloy film.

4. The solid rocket motor or ramjet according to claim 2, wherein the laser activation system comprises a laser source coupled to one or more optical fibers, the one or more optical fibers configured to direct a laser towards the metal phase alloy film such that the laser interacts with the metal phase alloy film in a substantially normal direction.

5. The solid rocket motor or ramjet according to claim 4, wherein the one or more optical fibers are aluminum-coated optical fibers.

6. The solid rocket motor or ramjet according to claim 5, wherein the one or more optical fibers are configured to bend 90 degrees within the combustion chamber.

7. The solid rocket motor or ramjet according to claim 5, wherein a portion of the metal phase alloy film comprises a bent portion, the bent portion being bent 90 degrees within the combustion chamber to allow the laser to interact with the bent portion.

8. The solid rocket motor or ramjet according to claim 2, wherein the initiator activation system comprises an initiator configured to convert an electrical charge to a hot exhaust output, the hot exhaust output configured to heat the metal phase alloy film to above a threshold temperature, within a predetermined time period, to ignite the metal phase alloy film, the initiator activation system being free of an intermediate booster charge.

9. The solid rocket motor or ramjet according to claim 2, wherein at least a portion of an outer surface of the metal phase alloy film is coupled to an inner surface of the at least one fuel.

10. The solid rocket motor or ramjet according to claim 9, further comprising an erodible inhibitor disposed within the combustion chamber.

11. The solid rocket motor or ramjet according to claim 10, wherein the erodible inhibitor is mechanically restrained in place within the combustion chamber.

12. The solid rocket motor or ramjet according to claim 10, wherein at least a portion of an outer surface of the erodible inhibitor is coupled to an inner surface of the metal phase alloy film.

13. The solid rocket motor or ramjet according to claim 12, wherein the at least one fuel comprises at least one multi-pulse fuel grain.

14. The solid rocket motor or ramjet according to claim 1, wherein the metal phase alloy comprises multiple layers formed into a single integral foil.

15. The solid rocket motor or ramjet according to claim 14, wherein the metal phase alloy film is a Ti-2B alloy, a Ni-Al alloy, and/or a Pd-Al alloy.

16. A method for propulsion, comprising:
combusting a grain ignition component consisting of a metal phase alloy film upon electrical activation, laser ignition, or initiator activation, at least a portion of the metal phase alloy film being coupled to at least one fuel; and
allowing the metal phase alloy film to ignite the at least one fuel over an area required to sustain burning.

17. The method for propulsion according to claim 16, further comprising releasing an inhibitor coupled to the at least one fuel.

* * * * *